(12) United States Patent
Ridenour

(10) Patent No.: US 6,575,502 B1
(45) Date of Patent: *Jun. 10, 2003

(54) CONDUIT CONNECTOR AND METHOD

(75) Inventor: Ralph G. Ridenour, Mansfield, OH (US)

(73) Assignee: Universal Tubular Systems Inc., Mansfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/713,398

(22) Filed: Nov. 15, 2000

Related U.S. Application Data

(62) Division of application No. 09/202,228, filed as application No. PCT/US97/17863 on Oct. 3, 1997, now Pat. No. 6,170,888.
(60) Provisional application No. 60/027,561, filed on Oct. 7, 1996.

(51) Int. Cl.[7] .................................................. F16L 13/14
(52) U.S. Cl. ..................... 285/382; 285/330; 285/382.4; 29/523
(58) Field of Search .................. 285/330, 351, 285/382.5, 382.4; 29/523

(56) References Cited

U.S. PATENT DOCUMENTS

| | | | |
|---|---|---|---|
| 2,685,461 A | 8/1954 | Mueller | |
| 3,787,945 A | 1/1974 | Pasek et al. | |
| 3,930,298 A | 1/1976 | Ridenour | |
| 3,977,710 A | 8/1976 | Ridenour | |
| 4,200,314 A | 4/1980 | Ridenour | |
| 4,262,942 A | 4/1981 | Ridenour | |
| 4,330,144 A | 5/1982 | Ridenour | |
| 4,450,618 A | 5/1984 | Ridenour | |
| 4,805,944 A | 2/1989 | Reginaldo | |
| 4,871,199 A | 10/1989 | Ridenour et al. | |
| 5,573,285 A | * 11/1996 | Ridenour | 285/353 |
| 5,727,303 A | * 3/1998 | Ridenour | 29/523 |
| 5,851,110 A | * 12/1998 | Ridenour | 431/278 |
| 6,170,888 B1 | * 1/2001 | Ridenour | 285/382.5 |

* cited by examiner

Primary Examiner—Eric K. Nicholson
(74) Attorney, Agent, or Firm—Daniel D. Wasil; Ralph E. Jocke; Walker & Jocke

(57) ABSTRACT

A conduit connection joint is formed to connect a tube and a fitting body in fixed fluid tight relation. The joint is made by compressing the tube in a bore in the fitting body so as to cause formation of at least two beads in the tube during the engagement of the tube to the bore wall. A retaining ridge may be formed in the fitting body to further hold the fitting body and tube in engaged relation.

31 Claims, 16 Drawing Sheets

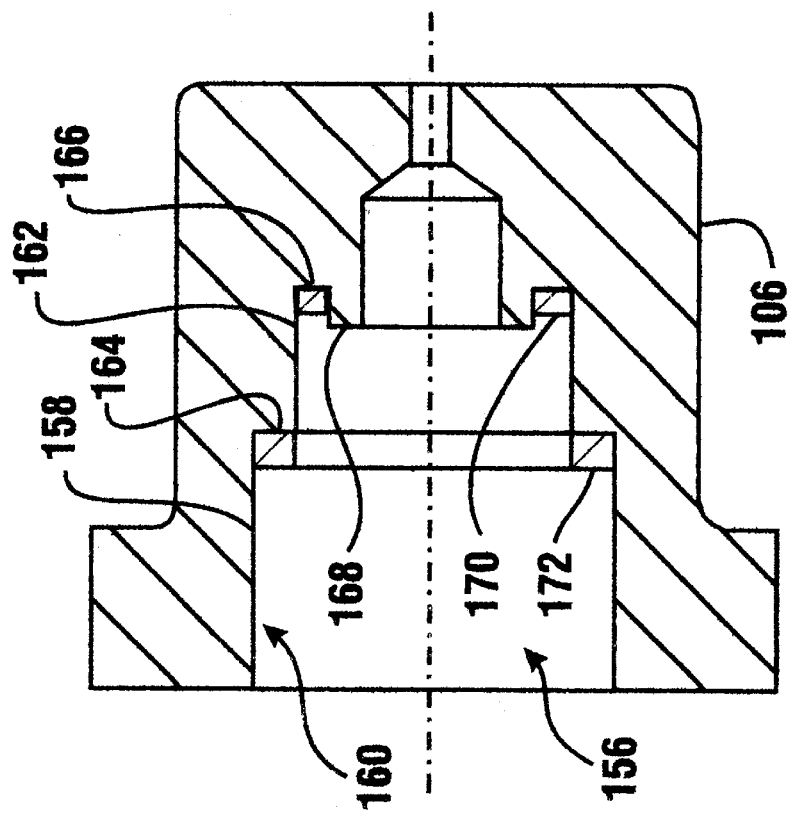
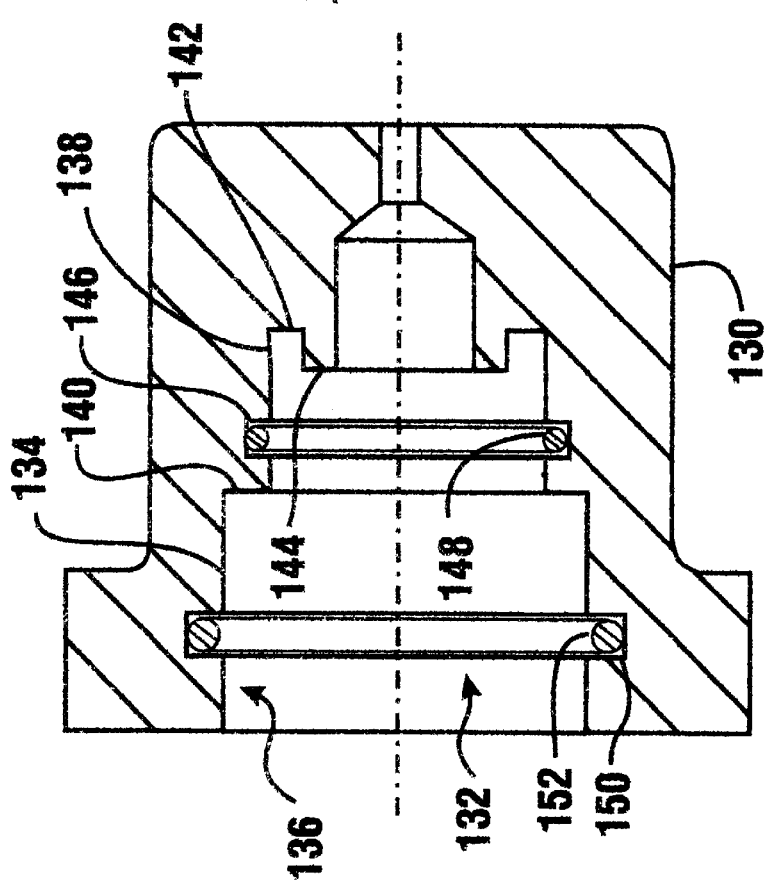
FIG. 13
FIG. 14

CONDUIT CONNECTOR AND METHOD

This application is a divisional of U.S. application Ser. No. 09/202,228 filed Dec. 9, 1998, now U.S. Pat. No. 6,170,888, which was the National Stage of International Application No. PCT/US97/17863 filed Oct. 3, 1997, which claims the benefit of U.S. Provisional Application No. 60/027,561 filed Oct. 7, 1996.

TECHNICAL FIELD

This invention relates to conduit connectors. Specifically, this invention relates to a joint for connecting a tube and a fitting body and the method of forming the joint.

BACKGROUND ART

Many types of conduit couplings are known in the prior art. One category of conduit couplings includes tube fittings which are used to join a tube or similar conduit and a fitting body.

One variety of tube fittings includes compression fittings. Such fittings involve the use of ferrules, nuts and other component pieces for holding a tube in fluid tight connection with a fitting body. Tube fittings of this variety have drawbacks in that they include several components. Such multiple components add to the cost of the fitting. In addition, the assembly of such fittings requires several steps. The completion of these steps takes time which further adds to the cost of using such connectors. The use of several components and a multi-step assembly process also increases the chance of defects which can result in leakage or other types of failure.

Stake type fittings are also known in the prior art. Such fittings have the advantage of being low in cost and may be assembled at high production rates. Examples of prior art stake type tube fittings are shown in U.S. Pat. Nos. 3,930,928, 3,977,710, 4,200,314, 4,262,942, 4,330,144 and 4,450,618, all of which are owned by the assignee of the present invention.

While the prior art stake type tube fittings perform well, there is always a desire to improve fitting performance, increase production rates and to reduce cost.

Thus, there exists a need for a joint connection for joining a tube and a fitting body that is lower in cost, more resistant to leakage, is more rapidly assembled and has greater resistance to unwanted disassembly due to applied forces.

DISCLOSURE OF INVENTION

It is an object of the present invention to provide a joint for connecting a tube and a fitting body.

It is a further object of the present invention to provide a joint for connecting a tube and a fitting body that is a stake type joint.

It is a further object of the present invention to provide a joint for connecting a tube and a fitting body that may be assembled quickly and with automated equipment.

It is a further object of the present invention to provide a joint for connecting a tube and a fitting body that is fluid tight and which provides greater resistance to leakage at higher pressures.

It is a further object of the present invention to provide a joint for connecting a tube and a fitting body that is lower in cost to produce and assemble.

It is a further object of the present invention to provide a joint for connecting a tube and a fitting body that provides greater resistance to unwanted disassembly and breakdown.

It is a further object of the present invention to provide a joint for connecting a tube and a fitting body that may be configured in a manner that is tailored to the particular operating requirements of the system in which it is used.

It is a further object of the present invention to provide a method for forming a joint connecting a tube and a fitting body.

It is a further object of the present invention to provide a method for connecting a tube and a fitting body that may be carried out at high production rates using automated equipment.

It is a further object of the present invention to provide a method for connecting a tube and a fitting body that results in a joint that has increased resistance to leakage, increased resistance to unwanted disassembly and breakdown, and which may be configured in a manner that is tailored to the particular operating requirements of the system in which the joint is used.

Further objects of the present invention will be made apparent in the following Best Modes for Carrying Out Invention and the appended claims.

The foregoing objects are accomplished in a preferred embodiment of the invention by a joint which connects a tube and a fitting body. The joint is manufactured by a process which includes the step of axially extending a hollow tube into a bore in a fitting body. The bore in the fitting body is bounded by a generally annular bore wall. The bore wall includes a generally axially extending bead formation area. The bead formation area is radially disposed outwardly from the tube when the tube is first extended into the bore.

The process of forming the joint further involves engaging an inward end of the tube against a stop face supported on the fitting body in the bore. Thereafter, the tube is compressed axially inward. The compression of the tube in engagement with the stop face causes the sequential formation of at least two outwardly extending beads in the tube. The beads extend outwardly and engage the bore wall in the bead formation area. The engagement of the beads with the bore wall provides a fluid tight joint.

In one form of the invention, after formation of the beads within the bore a tool is axially extended through the fitting opening. The tool operates to axially compress the beads as well as to expand the bead material outwardly into stronger interference engagement with the bore wall. The tool is then withdrawn leaving a joint which is resistant to leakage as well as highly resistant to unwanted disassembly due to internal pressure or external axial or torsional forces.

In another form of the invention the tool which is extended into the bore to compress and radially expand the beads also forms a retaining ridge in the fitting body adjacent to the bore opening. The retaining ridge engages the compressed bead material to resist separation of the joint.

In another form of the invention the bore wall though generally annular, includes a plurality of axially extending serrations. The serrations engage the beads and provide added resistance to rotational movement of the tube relative to the fitting body.

Other forms of the invention include annular seals and other sealing structures which operatively extend between the tube and the bore to resist fluid leakage. Such seals may include combinations of annular o-rings, disc seals and sealing materials which are formed in place. The sealing structures are tailored to enable the joint to satisfactorily operate under various temperature and pressure conditions.

BRIEF DESCRIPTION OF DRAWINGS

FIG. 13 is a cross sectional view of a seventh embodiment of a fitting body used in a joint of the present invention.

FIG. 14 is a cross sectional view of an eighth embodiment of a fitting body used in a joint of the present invention.

BEST MODES FOR CARRYING OUT INVENTION

Figure 1:
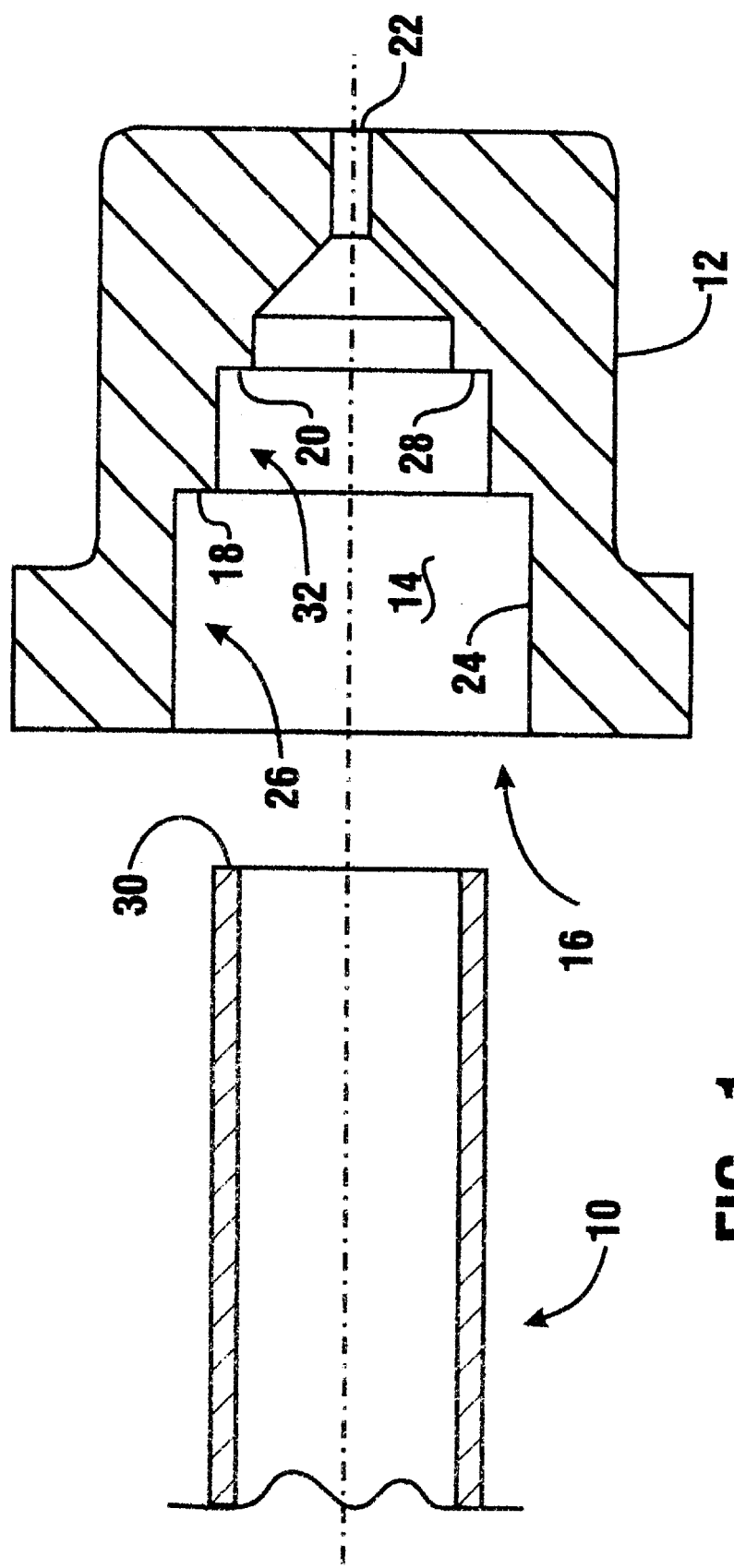
FIG. 1 is a cross sectional view of a tube and fitting body used to form the joint of a first embodiment of the present invention.

Referring now to the drawings and particularly to FIG. 1 there is shown therein a cross sectional view of a tube 10 and a fitting body 12 which are used to form a first embodiment of a joint connection of the present invention. Tube 10 is a conventional hollow tube which is comprised of a metallic material in the preferred embodiments of the invention. Tube 10 may be comprised of various types of deformable metallic materials and alloys thereof including, for example, aluminum and stainless steels.

Fitting body 12 is preferably comprised of metallic material similar to tube 10. However, in embodiments of the invention fitting body 12 need not be comprised of the same material as tube 10. In addition, in embodiments of the invention fitting body 12 may be comprised of materials which are non-metallic such as ceramic materials, high strength plastic compounds or assemblies which include such materials.

Fitting body 12 includes a bore 14. Bore 14 extends inwardly in a first axial direction from a circular bore opening 16. Bore 14 is a stepped bore in this first embodiment, and includes a first radially extending step 18. Bore 14 further includes a second radially extending step 20.

In the first embodiment of the fitting body of the invention shown in FIG. 1, bore 14 is in communication with a pilot opening 22 which extends through body 12 on a side opposed from bore opening 16. Pilot opening 22 enables fitting body 12 to serve as a nozzle.such as for passing combustible gas therethrough in a pilot light application. It should be understood however that the joint of the present invention may be used for connecting numerous types of tubes and fitting bodies having various configurations.

Bore 14 is bounded by a generally axially extending annular bore wall 24. A bead formation area generally indicated 26 extends in the bore between first step 18 and bore opening 16. The function of bead formation area 26 is later explained. The bore wall 24 in this embodiment is a relatively smooth, continuous annular wall throughout the bead formation area.

Second step 20 includes a stop face 28. In the first embodiment of the fitting body of the invention shown in FIG. 1, stop face 28 is a generally annular radially extending face. Tube 10 includes an inward end 30. Inward end 30 of the tube 10 includes a generally radially extending annular face which is sized for abutting engagement with stop face 28. A sleeve area 32 extends in bore 14 between first step 18 and second step 20. Tube 10 is also sized to have a diameter that is slidably engageable in close fitting relation into the sleeve area 32.

In forming the first embodiment of the joint, fitting body 12 is positioned in a cavity 34 in a retaining vice 36. Cavity 34 and retaining vice 36 are preferably sized for holding fitting body 12 in tight relatively immovable relation therein.

During formation of the joint, tube 10 is preferably held in a split jaw assembly generally indicated 38. Split jaw assembly 38 preferably includes a passageway 40 therethrough. In the preferred form of the invention the split jaw assembly 38 preferably includes a pair of separable jaws which are separated adjacent the passageway. The jaws are brought together to form the passageway 40 and to solidly hold tube 10 therein without collapsing it. The jaws of the split jaw assembly may be separated to release the tube. The split jaw assembly 38 preferably includes annular gripping projections 42 or other spaced projections, which extend inwardly in the passageway 40 to assist in firmly holding tube 10 therein when the split jaw assembly is in engagement with the tube.

Figure 2:
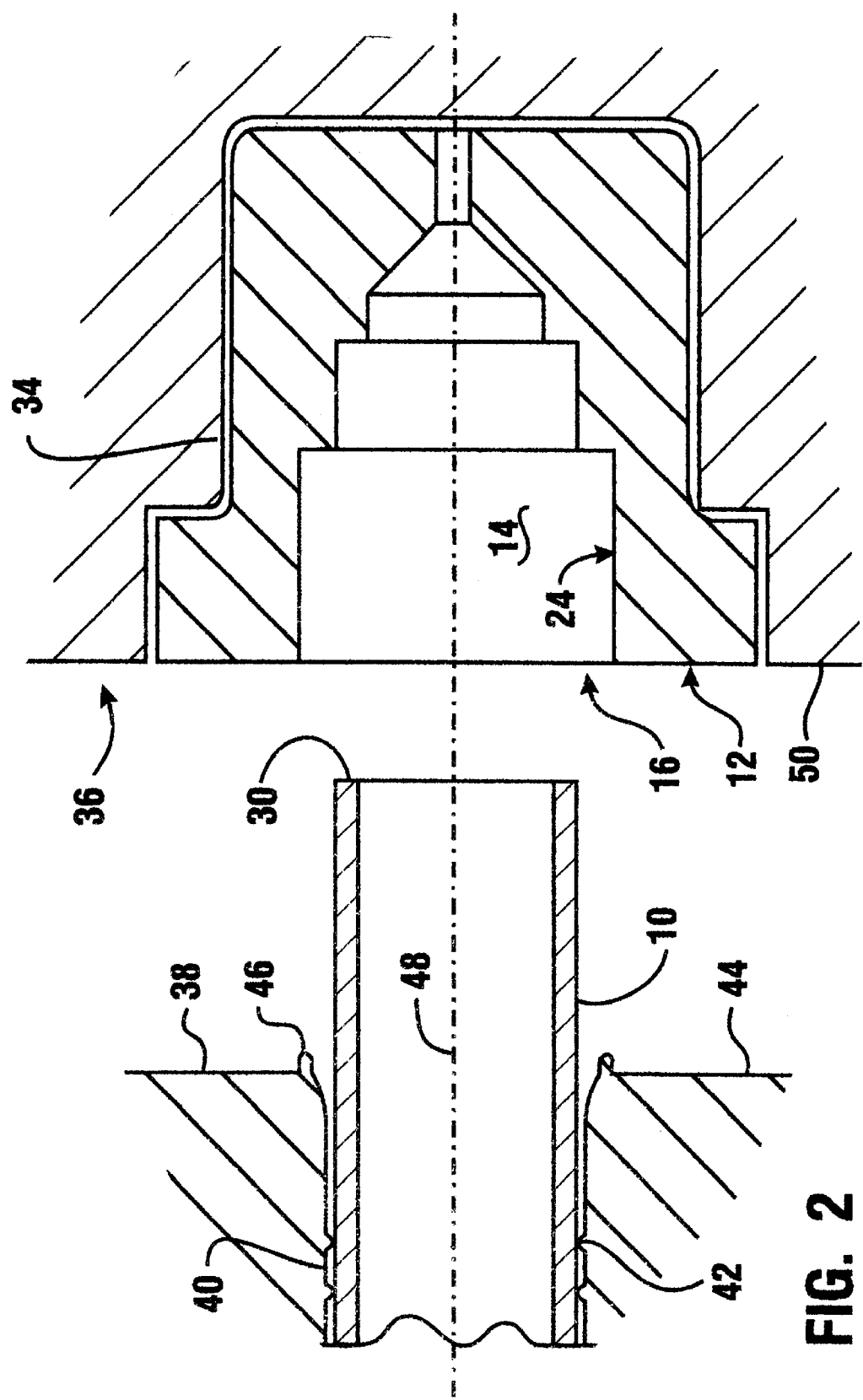
FIG. 2 is the tube and fitting body shown in FIG. 1 with the fitting body held in a retaining vice and the tube held in a pair of separable holding jaws.

Split jaw assembly 38 when in engaged relation with tube 10, provides a generally planar jaw face 44. Adjacent tube 10 on jaw face 44 is an annular, outward extending tool face or "bull nose" 46. Bull nose 46 is preferably positioned radially outwardly from tube 10 and inwardly disposed from bore wall 24 in the area of bore opening 16. It should be noted that while bull nose 46 is shown generally rounded in FIG. 2, in other embodiments the bull nose may have other configurations.

The retaining vice 36 and split jaw assembly 38 are relatively movable along an axis 48. The retaining vice and jaw assembly are preferably movable so as to bring jaw face 44 into close adjacent relation with a generally planar vice face 50 of retaining vice 36. When jaw face 44 and vice face 50 are in adjacent relation, bull nose 46 preferably extends into bore 14 for reasons which are later explained. While in the preferred embodiment of the invention the split jaw assembly is movable and the retaining vice is fixed, in other embodiments the retaining vice may be movable and the split jaw assembly relatively fixed, or both components may be movable so as to form the connecting joint hereinafter described.

Figure 3:
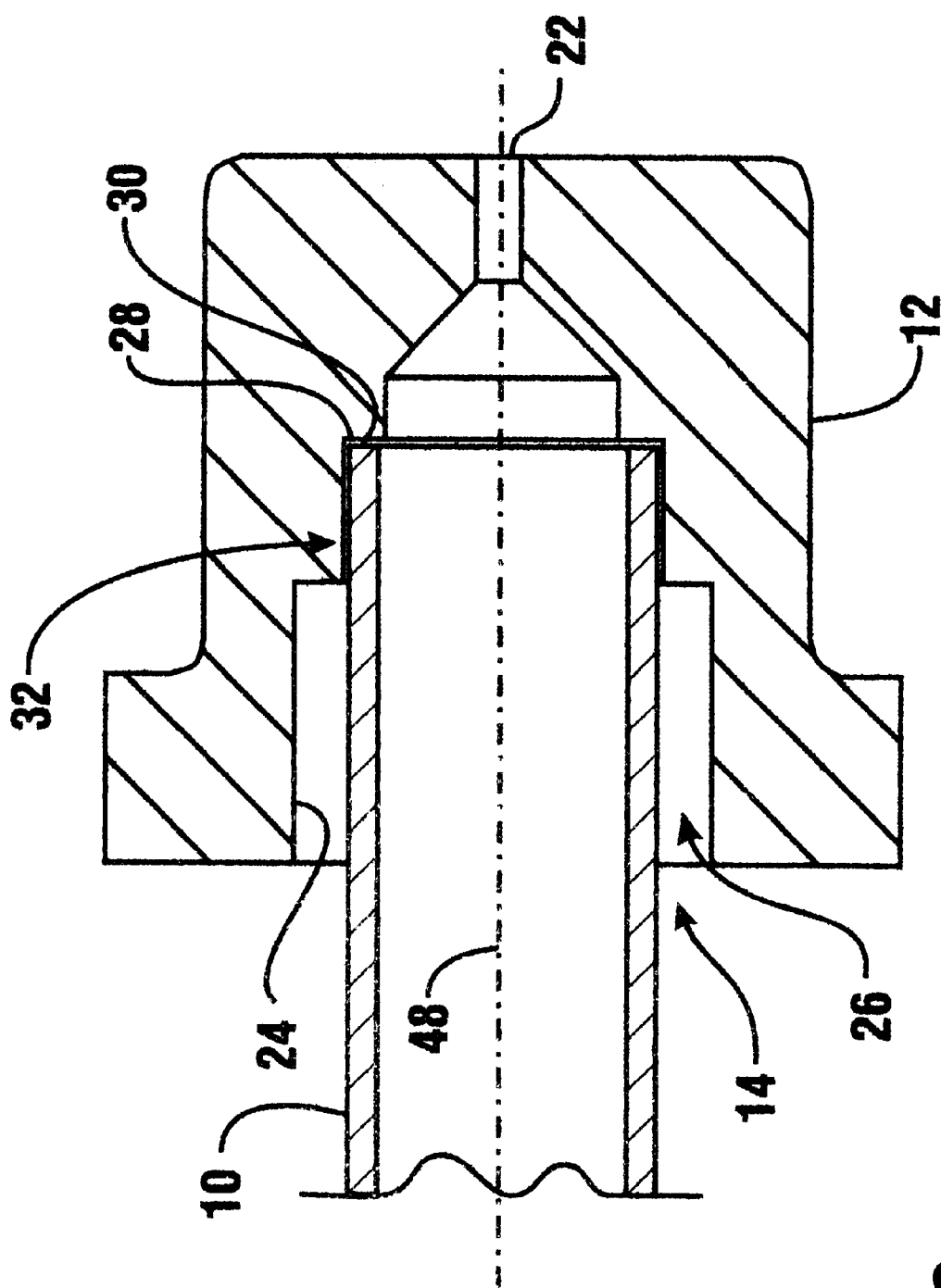
FIG. 3 is a cross sectional view of the tube and fitting body with the tube shown in a position when it is first inserted into the bore of the fitting body during a process of forming the joint.

In the process of forming the connecting joint of the first embodiment, tube 10 is moved by the split jaw assembly 38 along axis 48 in a first axial direction toward the fitting body. Tube 10 is moved so that the tube extends into bore 14 as shown in FIG. 3. The tube 10 is moved until the inward end 30 of the tube engages stop face 28 in bore 14. It should be noted that when the tube is first inserted into the bore 14 as shown in FIG. 3 the outer surface of the tube 10 is in close fitting adjacent relation with the sleeve area 32 in the fitting body. The outer wall of the tube 10 is also radially inwardly disposed from bore wall 24 throughout the bead formation area 26.

Figure 4:
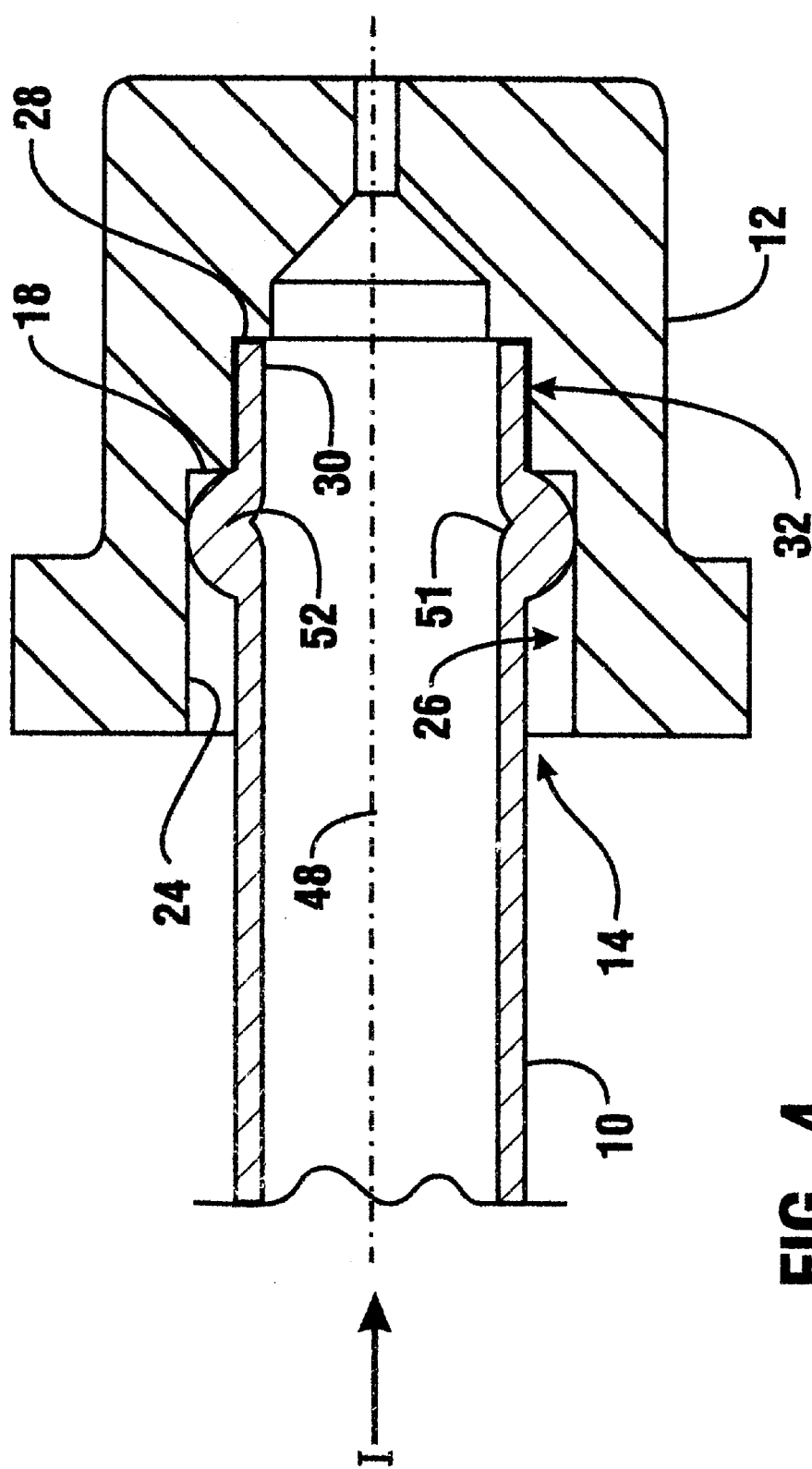
FIG. 4 is a view similar to FIG. 3 and showing a next step in the formation of the joint wherein a bead has been formed in the tube.

A next operative step in formation of the joint is shown in FIG. 4. Tube 10 is moved further radially inward in the first axial direction by the split jaw assembly as indicated by Arrow I. The inward movement of the tube compresses the material comprising the tube. The compressive force deforms the tube in the bore 14. Tube 10 is deformed at its inward end 30 so as to continuously engage the fitting body in the area of stop face 28. The compressive force further causes the tube to bulge outwardly in the bead formation area adjacent to first step 18. Tube 10 is caused to bulge outwardly because it is in close fitting engagement with sleeve area 32 and can more readily expand in the bead formation area 26.

The outward bulging of the tube in the bead formation area adjacent to first step 18 causes the formation of a first ripple or bead 52 adjacent to the first step. The first bead 52 is formed in this manner due to the proprieties of metallic material and the fact that metal is cold worked so as to increase its strength upon deformation. An annular arch indicated 51 forms at the inside surface of the tube as the tube undergoes compression. The arch resists plastic deformation in the area of the arch and causes the material of the tube to deform radially outward. The radially outward deformation continues until the developing bead engages the annular wall which limits further outward deformation. First bead 52 when fully formed is in engagement with first step 18 and bore wall 24.

Tube 10 is then moved further inwardly by the split jaw assembly 38 from the position shown in FIG. 4. The further axial inward movement of the tube 10 into the bore 14 of the fitting body results in formation of a second bead 54. Second bead 54 is formed axially outwardly from bead 52 due to the cold working of the metal in the area of the first bead. As a result, a second arch indicated 53 is formed at the inner surface of the tube and further deformation occurs outwardly resulting in formation of second bead 54. The relatively strong arcuate inner surface of the tube 10 provides strength and support which results in bead formation and prevents collapse of the tube in a radially inward direction.

Second bead 54 engages the bore wall 24 in the bead formation area 26. Further, in the embodiment of the invention shown in FIG. 5 second bead 54 extends slightly outwardly from bore opening 16.

It should be understood that as the tubing 10 and fitting body 12 are moved and compressed together, the external portion of the tube which extends in the split jaw assembly is held in supported, close fitting relation in the passageway 40. This prevents the formation of beads in the tube in the area outside the bead formation area 26 within the fitting body.

Figure 5:
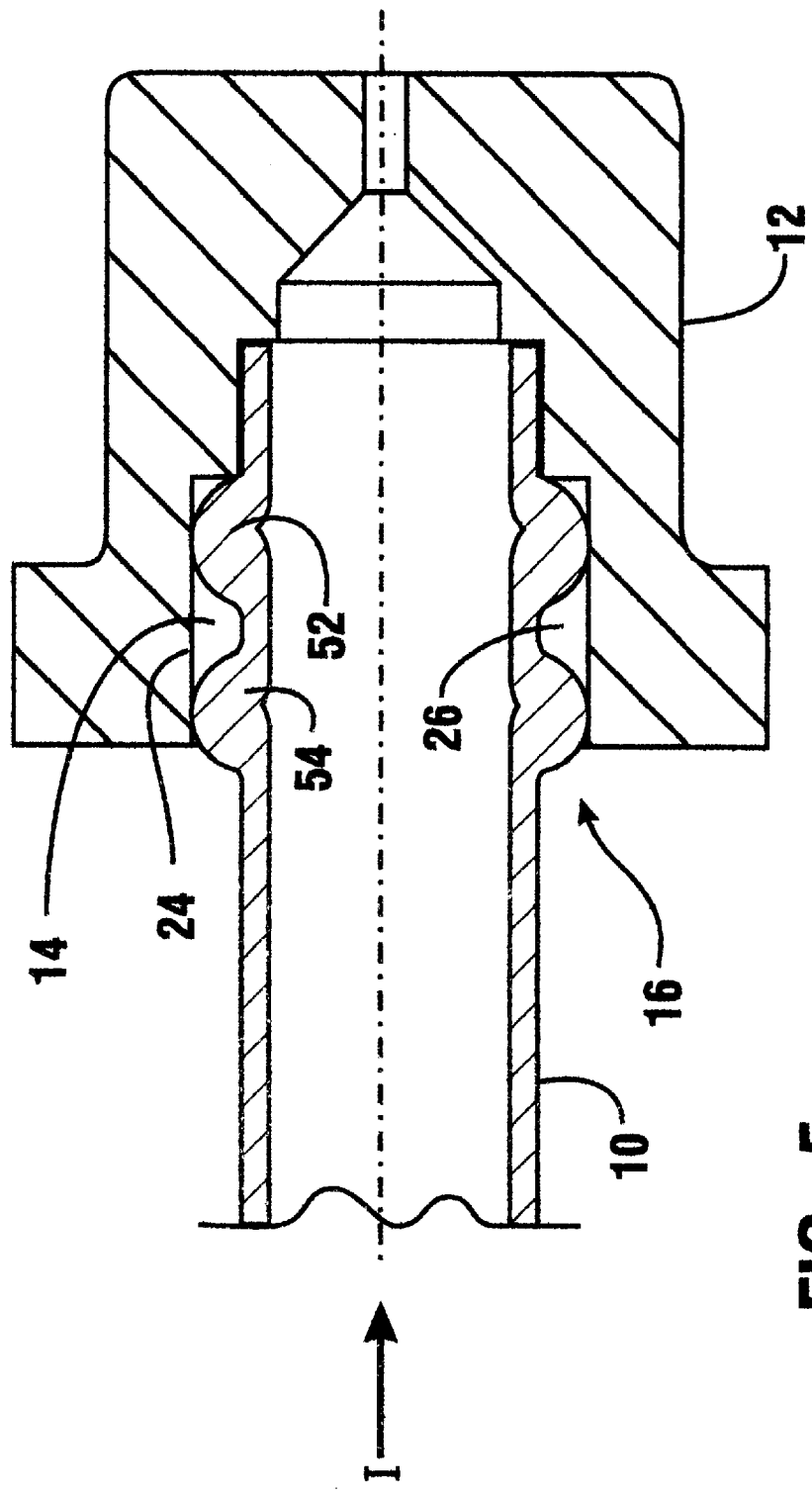
FIG. 5 is a view similar to FIG. 4 showing the next step in the formation of the joint wherein a second bead has been formed in the tube.

The first and second beads form a strong and fluid tight joint connection between the tube 10 and the fitting body 12. For some applications the double bead connection in the form shown in FIG. 5 provides a suitable leak proof connection between the tube and fitting body. In a preferred form of the first embodiment of the invention however, the beads 52 and 54 are further compressed in the axial direction and expanded radially outwardly so as to provide enhanced resistance to leakage and stronger engagement between the tube and fitting body.

Figure 6:
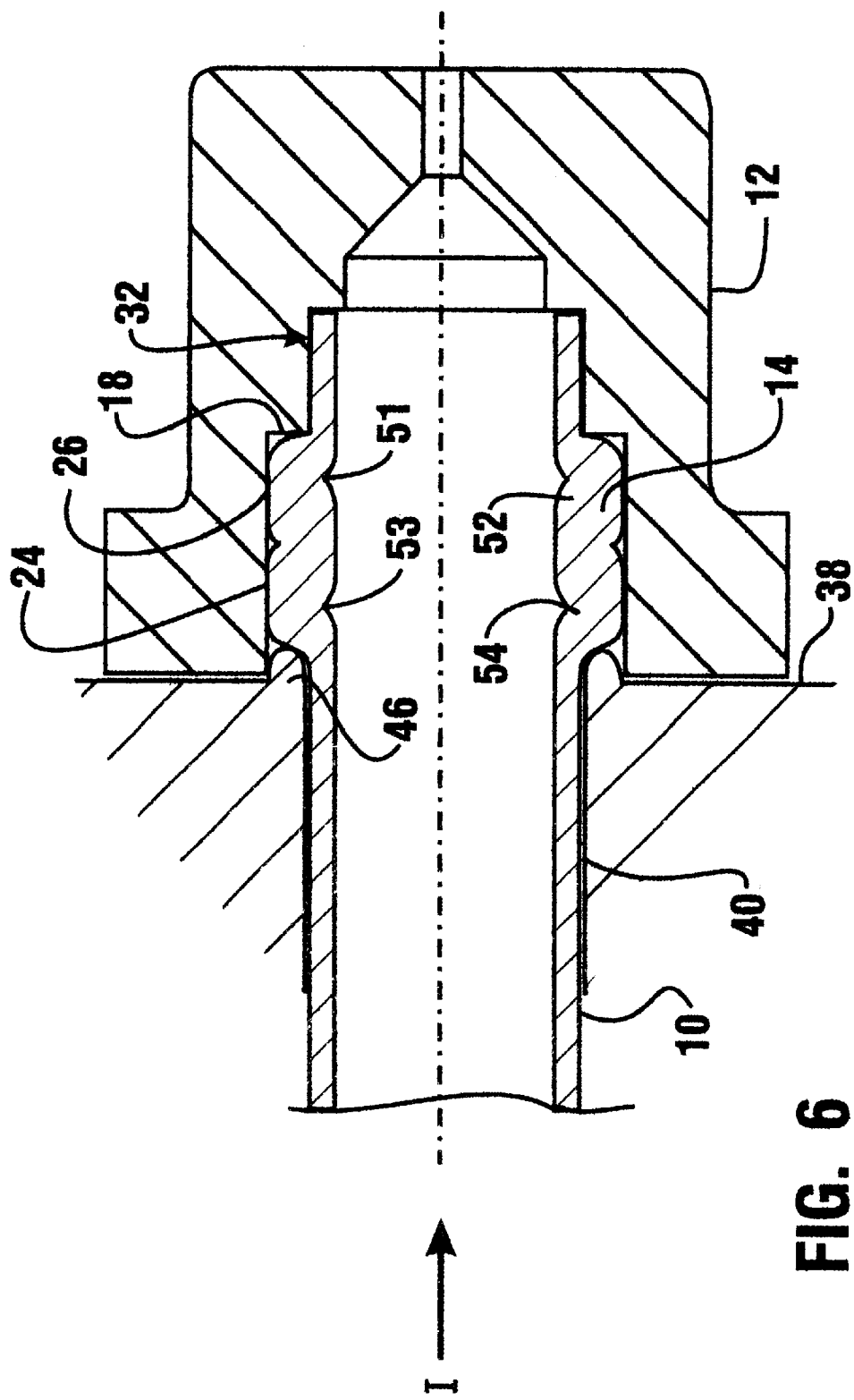
FIG. 6 is a view similar to FIG. 5 showing the next step in formation of the joint wherein the beads have been compacted axially and expanded radially outwardly.

The completion of the further process steps of axially compressing the beads and expanding the bead material outwardly is represented in FIG. 6. From the position of tube 10 shown in FIG. 5 the tube is moved further axially inwardly in the direction of Arrow I. This moves more tube material into the bead formation area. The annular tool face or bull nose 46 on the split jaw assembly 38 also moves axially inward in the bore 14. As the bull nose 46 moves inwardly it axially compresses beads 52 and 54 so they more completely fill the bead formation area 26 in the area adjacent first step 18. The deformed bead material enhances the continuous fluid tight connection of the tube and fitting body. In addition, the action of bull nose 46 further serves to radially expand beads 52 and 54 outwardly against bore wall 24. This radial expansion is aided by the movement of more material into the bead formation area as the bull nose moves inwardly. This axial compaction and radial expansion of the beads provides an enhanced interference fit between the tube 10 and the fitting body 12.

The split jaw assembly 38 is then opened to release tube 10 and the fitting body 12 is removed from the cavity 34 in the retaining vice 36. The walls of the fitting body 12 surrounding the bore 14 are preferably strong enough so that the outer surfaces of the fitting body 12 are not permanently deformed as the joint is formed. However, the beads 52 and 54 and the bore wall 24 maintain a tight interference fit both in the bead formation area 26 as well as in the sleeve area 32 after the force applied by the jaw assembly is withdrawn. This results in a strong fluid tight joint that is highly resistant to leaks and which has greater resistance to pulling apart by axial or torsional forces.

Figure 16:
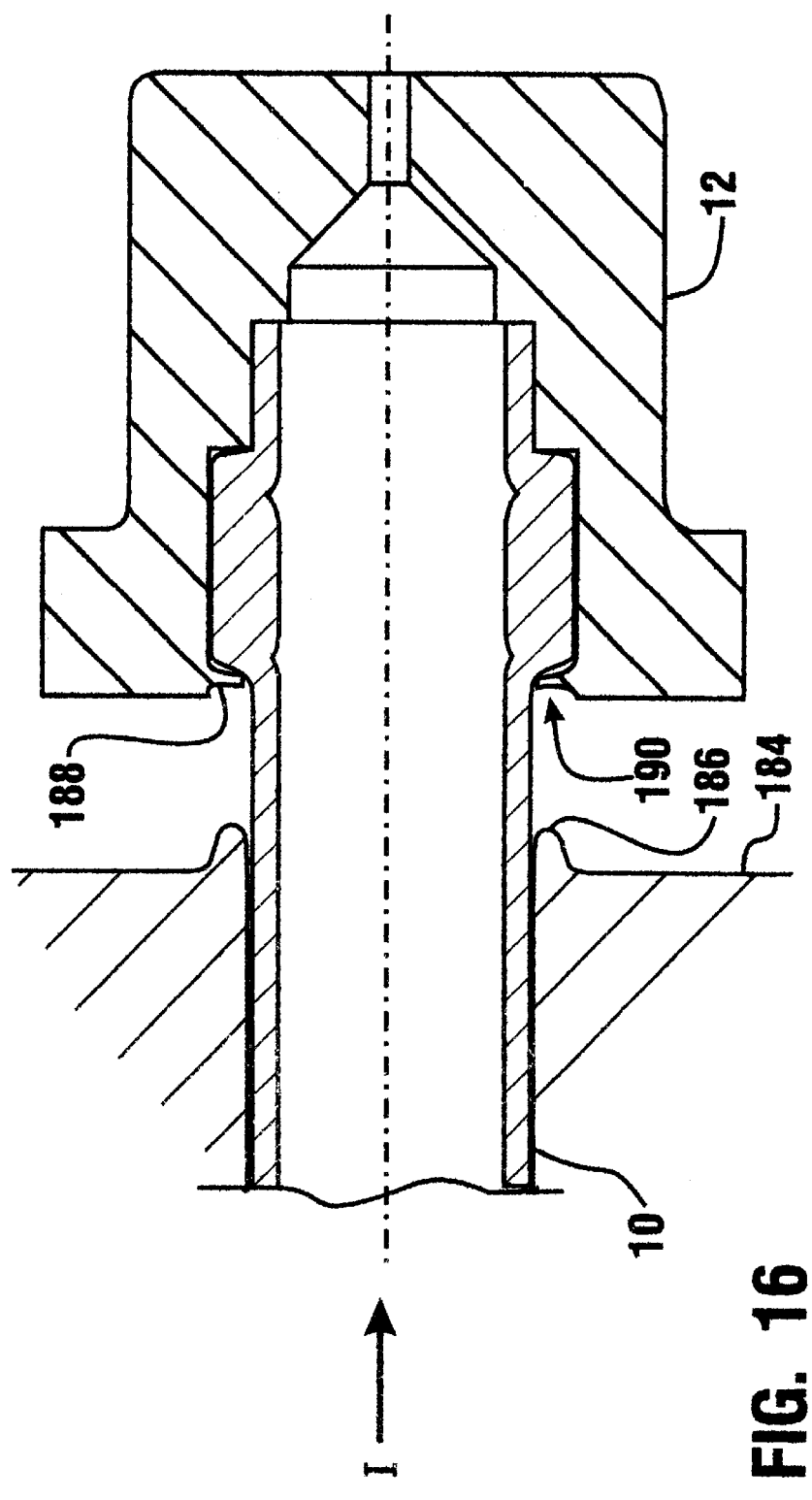
FIG. 16 is a cross sectional view of an alternative embodiment of a joint of the present invention and a split jaw assembly used in forming the joint.

Alternatively as shown in FIG. 16, a split jaw assembly 184 may be provided with an alternatively configured annular tooling face or bull nose 186. The alternative jaw assembly has the bull nose 186 configured to axially compress the bead material and expand it radially outwardly. In addition bull nose 186 is configured to deform the material of the fitting to form an inward extending annular retaining ridge 188 in the metallic fitting body 12 adjacent to the bore opening 190. Retaining ridge 188 serves to increase the resistance of the joint to axial forces acting to separate the tube and fitting body. In other embodiments the retaining ridge may comprise discrete arcuate segments instead of a fully annular ridge.

Figure 17:
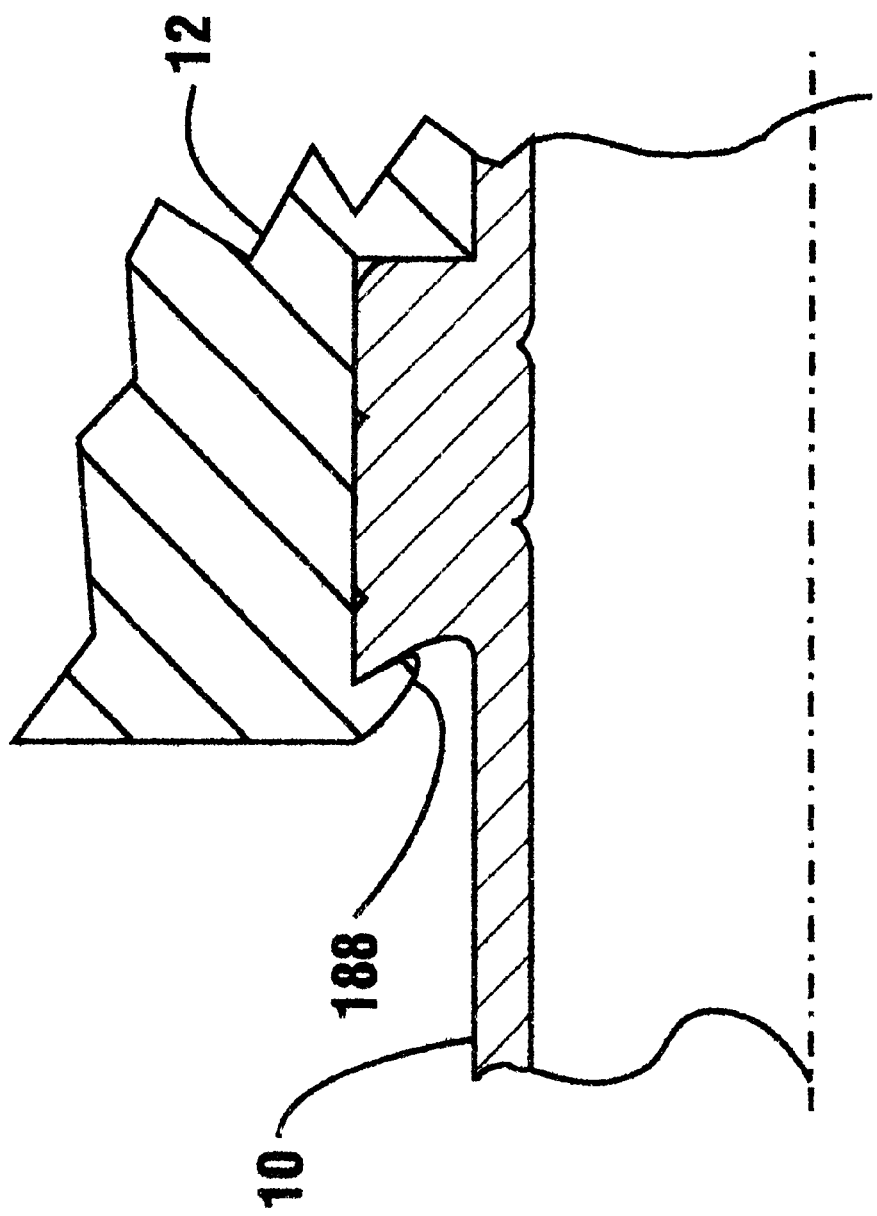
FIG. 17 is an enlarged cross sectional view of the joint shown in FIG. 16.

As shown in FIG. 17, the retaining ridge 188 is preferably formed in the fitting body so as to be tapered axially and radially inward into the bore. This configuration provides a hook-like engagement with the bead material which resists separation of the tube and fitting body. This tapered configuration also provides the advantage that pull out force on the tube results in a force by the retaining ridge which tends to radially expand the bead material. This further aids in resisting separation.

Figure 7:
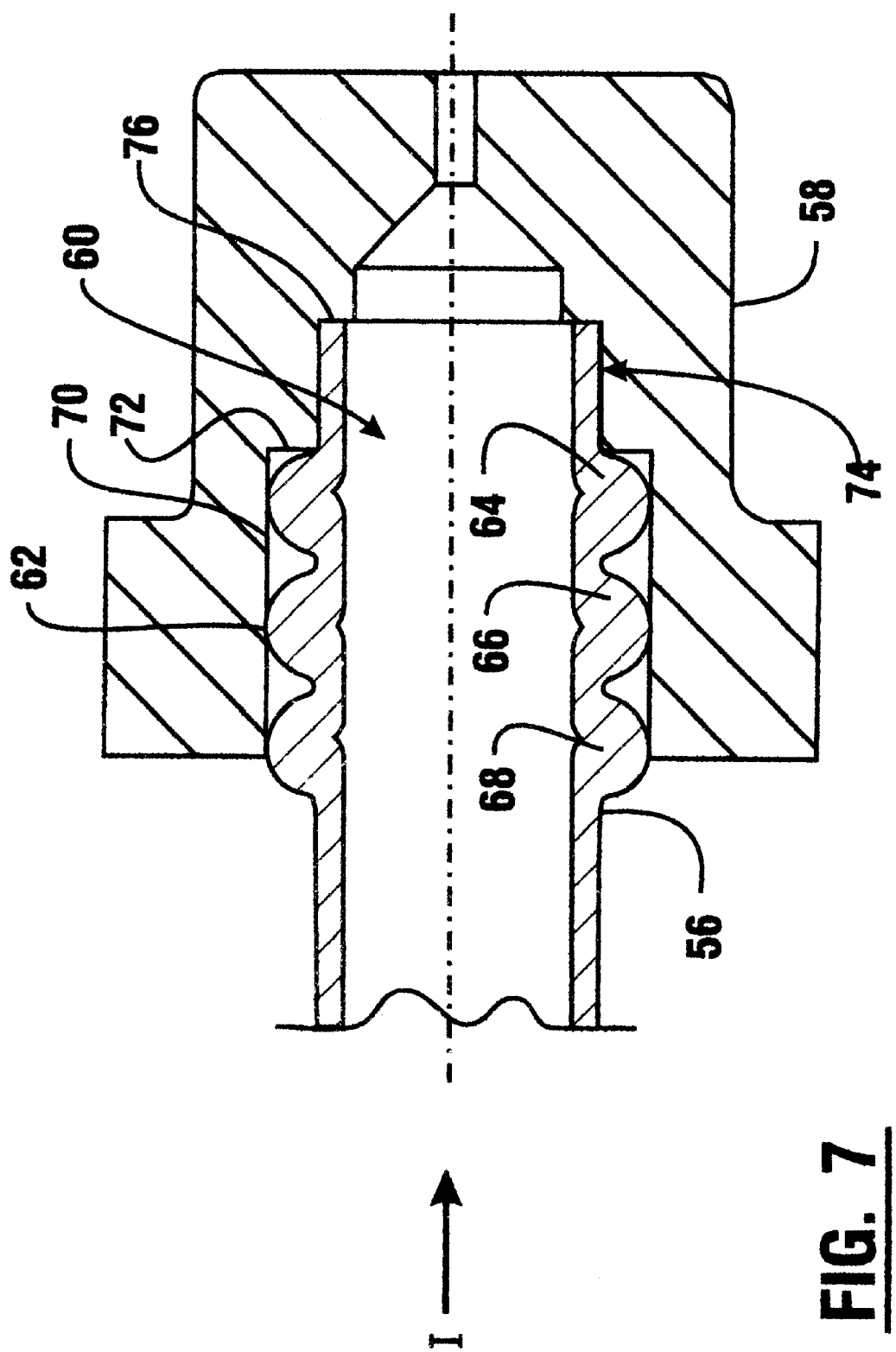
FIG. 7 is a first alternative embodiment of a joint showing a fitting body and three beads formed in a tube inserted therein.
Figure 8:
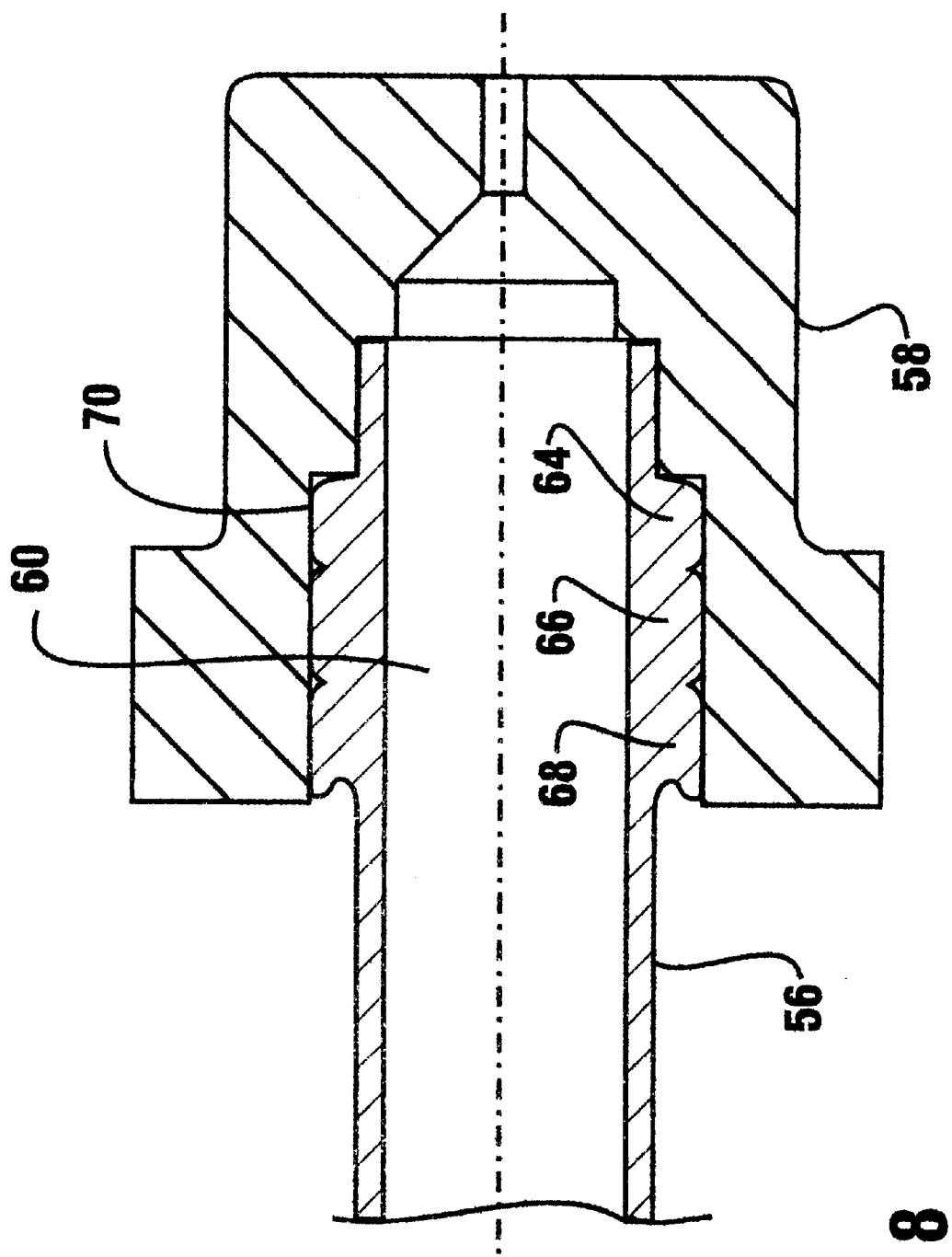
FIG. 8 shows the joint in FIG. 7 after the beads have been compacted axially and expanded radially outwardly.

A first alternative embodiment of the joint connection is shown in FIGS. 7 and 8. FIG. 7 shows a tube 56 and a fitting body 58. Fitting body 58 is similar to fitting body 12 except that it includes a bore 60 with a bead formation area 62 that is longer in the axial direction than bead formation area 26 of the previously described embodiment.

As shown in FIG. 7, movement of tube 56 in the direction of Arrow I axially compress the tube. This results in the sequential formation of three beads 64, 66 and 68. The beads are formed in the manner of the beads in the embodiments described previously.

Beads 64, 66 and 68 engage a bore wall 70 which bounds bore 60 in the bead formation area 62. In addition, bead 64 engages a first step 72 in the bore to provide a continuous fluid tight connection. The axial compression of tube 56 further provides a continuous fluid tight engagement of the tube with a sleeve area 74 in the bore, as well as with a first step 76 in a manner similar to that described for the previous embodiment.

The properties of the joint shown in FIG. 7 are further enhanced by the axial compression of beads 64, 66 and 68 as well as by the radial expansion of these beads. This is preferably accomplished in a manner similar to that previously discussed by a tool face or bull nose on a split jaw assembly or other apparatus which holds the tube 56 therein. Further, the beads 64, 66 and 68 are preferably expanded outwardly so as to form an enhanced interference fit with bore wall 70.

FIG. 8 shows the joint in FIG. 7 after the beads have undergone axial compression and radial expansion. These further steps serve to increase resistance to leakage and enable the joint to operate at higher pressures. In addition, this enhanced interference fit increases resistance to unwanted disassembly or breakdown of the joint due to torsional or axial forces. The joint of FIG. 8 may alternatively include a retaining ridge similar to that in the embodiment shown in FIGS. 16 and 17.

Figure 9:
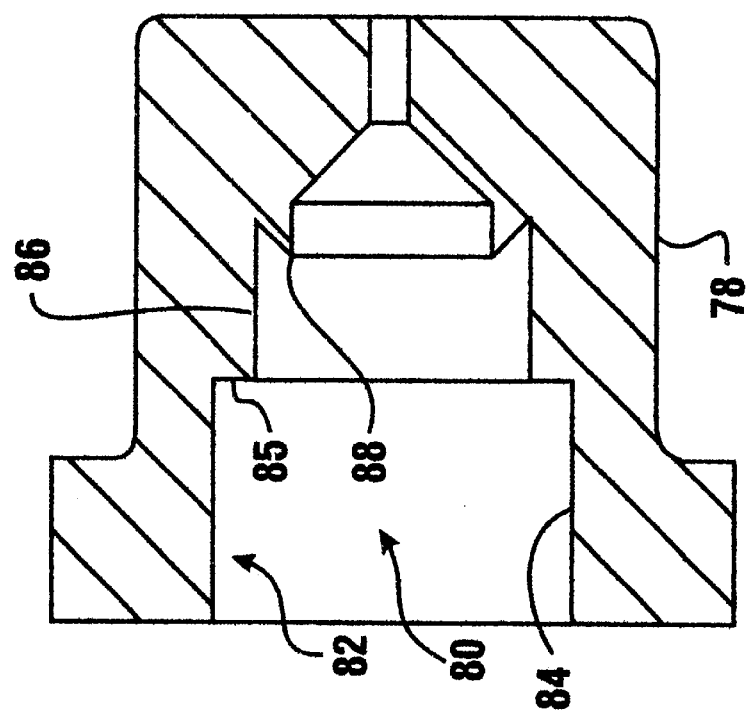
FIG. 9 is a cross sectional view of a third embodiment of a fitting body used in a joint of the present invention.

Alternative embodiments of the joint of the present invention may be formed using alternative configurations of tubes and fitting bodies. An alternative type fitting body that may be used in the formation of a joint connection with a round tube similar to tubes 10 and 56, is shown in FIG. 9. FIG. 9 discloses a fitting body 78. Fitting body 78 is similar to fitting bodies 12 and 58 in that it includes a bore 80 therein. Bore 80 includes a bead formation area 82 which is bounded by a generally smooth, continuous bore wall 84. Bore 80 also includes a radially extending annular first step 85.

Fitting body 78 also includes a sleeve area 86 which is sized to be in close fitting relation with a tube inserted therein. Fitting body 78 differs from the previously described embodiments in that instead of having a radially extending second step it includes a frustoconical portion 88. Frustoconical portion 88 is tapered so as to extend both radially outward and in the first axial direction from the point where it engages an inward end of a tube which is extended in the bore 80.

The process for formation of the joint connection using the fitting body 78 is similar to that of the previous embodiments. However, the frustoconical portion 88 also forces the inward end of the tube radially outwardly and deforms the tube so as to engage the sleeve area 86 in an enhanced interference fit. Frustoconical portion 88 also serves to increase the area of engagement between the inward end of the tube and the fitting body. This improves the resistance of the joint to leakage when using certain materials for the tube and fitting body. Of course, at least two beads are formed in the tube in the bead formation area 82 of fitting body 78. These beads may thereafter be compressed in the axial direction and/or expanded outwardly so as to further strengthen the seal and interference fit between the fitting body and the tube.

Figure 10:
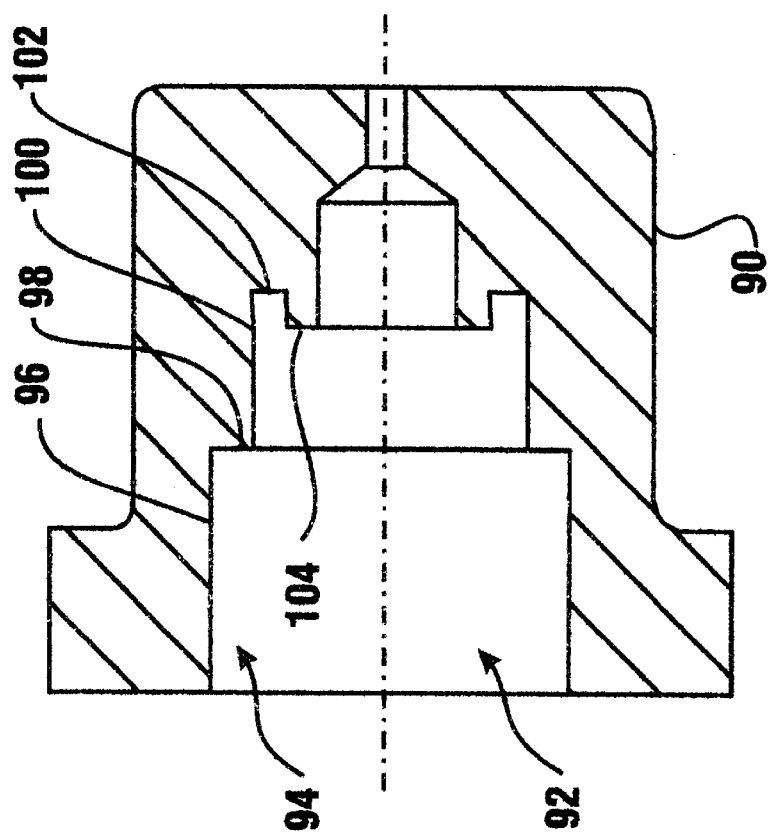
FIG. 10 shows a cross sectional view of a fourth embodiment of a fitting body used in a joint of the present invention.

A further alternative embodiment of a fitting body generally indicated 90 is shown in FIG. 10. Fitting body 90 may be used to form joint connections with a tube in a manner similar to that described with regard to the previous embodiments.

Fitting body 90 includes a bore generally indicated 92. Bore 92 includes a bead formation area 94. Bore 92 is bounded in the bead formation area 94 by a generally smooth, continuous bore wall 96. Bore 92 further includes a first step 98 similar to those of the previously described embodiments, as well as a sleeve area 100 which is sized to be in close fitting relation with a deformable metallic tube inserted therein.

Unlike the previously described embodiments, fitting body 90 includes an annular recess 102 in the bore. Recess 102 is sized for accepting an inward end of a tube therein in nested relation. Recess 102 bounds a centered cylindrical projection 104.

In formation of a joint connection using fitting 90 the joint is formed through the formation of beads in the manner described with regard to the previous embodiments. However, in fitting 90 the recess 102 and cylindrical projection 104 provide added support for the inward end of the tube. In addition, this configuration provides additional surface area for sealing between the inward end of the tube and the fitting body so as to provide increased resistance to leakage.

As with the previously described embodiments, fitting 90 may be configured so as to provide for the formation of two or more beads in the bead formation area. In addition, the beads so formed may thereafter be axially compressed and/or radially expanded so as to provide an enhanced interference fit between the tube and the fitting body. A retaining ridge may also be formed in the fitting body. A gasket structure may be provided in annular recess 102 to provide enhanced resistance to leakage.

Figure 15:
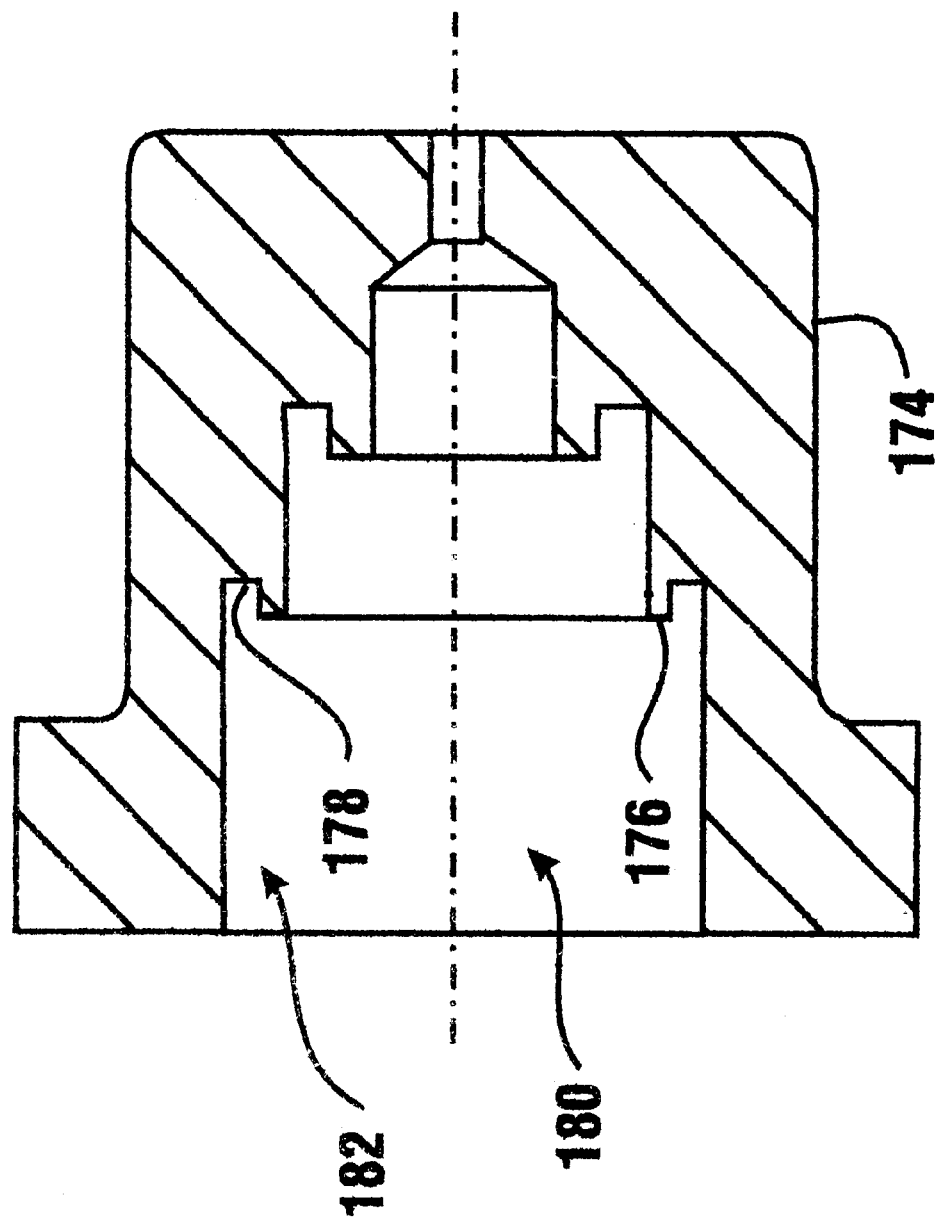
FIG. 15 is a cross sectional view of a ninth embodiment of a fitting body used in a joint of the present invention.

An alternative embodiment of the fitting body 90 is fitting body 174 shown in FIG. 15. Fitting body 174 is similar in all respects to fitting body 90 except as otherwise described.

In lieu of step 98, fitting body 174 includes an annular projection 176 which is surrounded by an annular recess 178. Upon formation of the connecting joint by axial compression of a tube in a bore 180 of fitting body 174, annular beads are formed in a bead formation area 182. Upon further axial compression of the bead material of the tube, the bead material is deformed into packed engagement with the projection 176 and recess 178. This enhances sealing and increases the strength of the joint connection. Alternatively, gasket structures may be provided in one or both of the radially extending annular recesses of fitting body 174.

Figure 11:
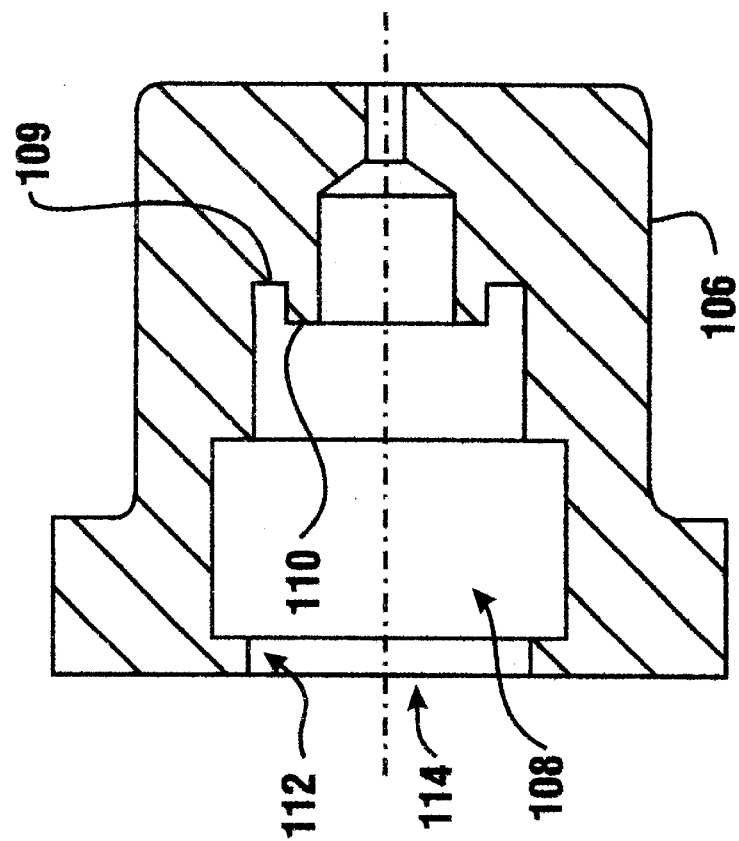
FIG. 11 is a cross sectional view of a fifth embodiment of a fitting body used in a joint of the present invention.

A further embodiment of a fitting body 106 used with a joint connection of the present invention is shown in FIG. 11. Fitting body 106 is similar to fitting body 90 in that it includes a bore 108 which includes a recess 109 and a centered, raised cylindrical area 110.

Unlike fitting body 90 however, bore 108 of fitting body 106 includes an annular inward extending projection 112. Annular projection 112 extends adjacent to an opening 114 of the bore.

In formation of a joint connection using fitting body 106 a tube is axially compressed so as to form at least two beads in a bead formation area within bore 108. The bead formation area is axially sized so the outer bead in the tube is formed in a location so that it engages an interior surface of annular projection 112. Such engagement strengthens the joint connection by providing enhanced resistance to separation due to axial forces. In addition, like the joints of the prior embodiment, a bull nose or other properly sized tool face may be used to axially compress and radially expand the beads formed in the bore if it is desired to increase the engaging forces which provide sealing and an enhanced interference fit between the tube and fitting body. The annular projection may also be deformed in a manner similar to the retaining ridge of embodiments previously described.

Figure 12:
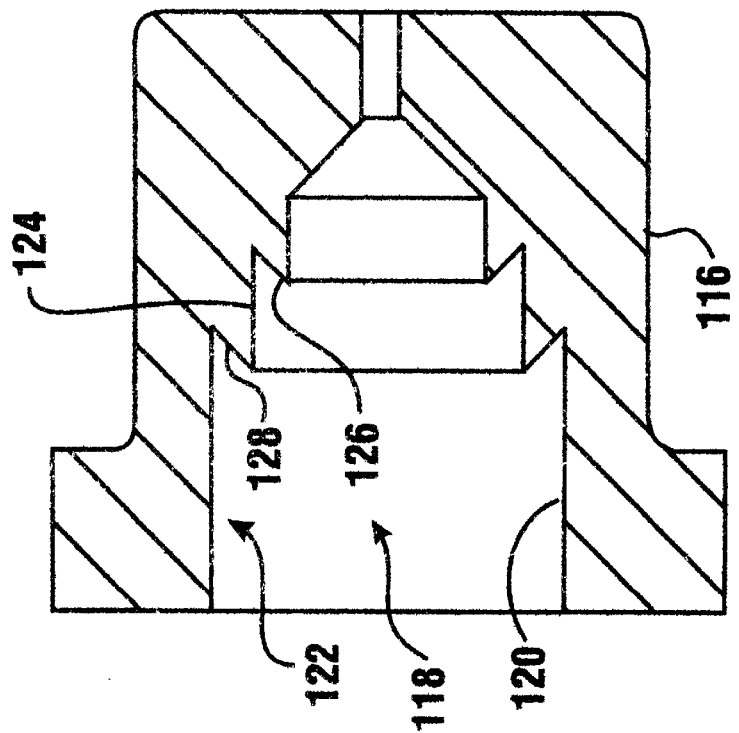
FIG. 12 is a cross sectional view of a sixth embodiment of a fitting body used in a joint of the present invention.

A further embodiment of a fitting body 116 used with a joint connection of the present invention is shown in FIG. 12. Fitting body 116 is similar to fitting body 78 as shown in FIG. 9 except as otherwise described. It includes a bore 118 which is bounded by a bore wall 120 in a bead formation area 122. The fitting body 116 further includes a sleeve area 124 and a first frustoconical portion 126.

Fitting body 116 further includes a second frustoconical portion 128 extending between the sleeve area 124 and the bore wall 120. Second frustoconical portion 128 is tapered to extend both radially outward from the sleeve area in the fitting body and in the first axial direction.

In the process of forming the joint of the invention using fitting body 116, first frustoconical portion deforms the tube outwardly to engage the sleeve area 124 in an enhanced interference fit and increases the area of engagement between the inward end of the tube and the fitting body as in the embodiment shown in FIG. 9. Second frustoconical portion 128 serves to increase the surface area for engagement with the beads formed in bead formation area 122, particularly when such beads are axially compressed. The taper of the second conical portion 128 further tends to move the axially compressed bead material radially outward during axial compression to engage the bore wall. This further strengthens the connection of the tube and the fitting and reduces the risk of leakage.

A further alternative embodiment of a fitting body generally indicated 130 is shown in FIG. 13. Fitting body 130 is similar to fitting body 90 shown in FIG. 10 except as otherwise noted. The body includes a bore 132 bounded by a bore wall 134. Adjacent the bore wall 134 is a bead formation area 136. Fitting body 130 includes a sleeve area 138. An annular step 140 extends between the sleeve area and the bead formation area 136. Body 130 further includes an annular recess 142 which bounds a cylindrical projection 144.

Body 130 includes a first annular groove 146. Groove 146 extends in the sleeve area intermediate the recess 142 and step 140. A resilient first seal or o-ring 148 is nested in groove 146. A second annular groove 150 extends in bore wall 134. A resilient second seal or o-ring 152 is nested in groove 150.

In the process of forming the joint of the invention using the fitting body 130 a tube is deformed in the bore in the manner previously described with regard to FIG. 10. However, the first o-ring 146 in the sleeve area 138 provides further sealing action between the tube and fitting body in the sleeve area. Likewise, second o-ring 152 provides further sealing action between the fitting body and the tube in the bead formation area 136.

It should be understood that while in fitting body 130 two annular grooves and o-rings are shown, in other embodiments one of the grooves or o-rings may be eliminated. In other embodiments multiple grooves and o-rings may be provided in either the sleeve area or the bead formation area of the fitting body. Alternatively a gasket structure may be provided in annular recess 142.

A further alternative fitting body 154 is shown in FIG. 14. Fitting body 154 is similar to the fitting body shown in FIG. 10 except as otherwise described. Fitting body 154 includes a bore 156 bounded by a bore wall 158. A bead formation area 160 extends in the bore adjacent the bore wall.

Fitting body 154 further includes a sleeve area 162. An annular step 164 extends between the sleeve area and bead formation area 160. The fitting body further includes an annular recess 166 adjacent the sleeve area. A cylindrical projection 168 bounds the annular recess.

A first annular seal 170 extends in nested relation in annular recess 166. A second annular seal 172 extends in bore 156 adjacent step 164. Second seal 172 is sized to include an opening through which a tube may be extended into the sleeve area. The opening is preferably sized so that the seal engages the outer surface of the tube. The seals are preferably comprised of resilient material.

The connecting joint of the invention is formed using fitting body 154 in a manner similar to that previously discussed. First seal 170 is operative to assist in providing a fluid tight seal between the fitting body and an inward end of a tube. Second seal 172 is operative to provide an enhanced fluid tight seal between the bead material of the tube in the bead formation area and the fitting body.

It should be understood that while the embodiment of the invention shown in FIG. 14 includes seals adjacent to the inward end of a tube and in the bead formation area, in other embodiments only one of such seals may be used. In addition, the seal construction of the embodiment shown in FIG. 14 may be used in combination with the o-ring seal construction shown in FIG. 13. The number and types of gasket structures used in embodiments of the invention can be tailored to the particular materials used to form the joint, as well as the temperature, pressure and type of material conducted through the joint. Gasket structures may include various resilient or non resilient materials. Such gaskets may be preformed materials comprised of items such as for example, elastomers or TFE, or formed in place gasketing or sealing materials.

Figure 18:
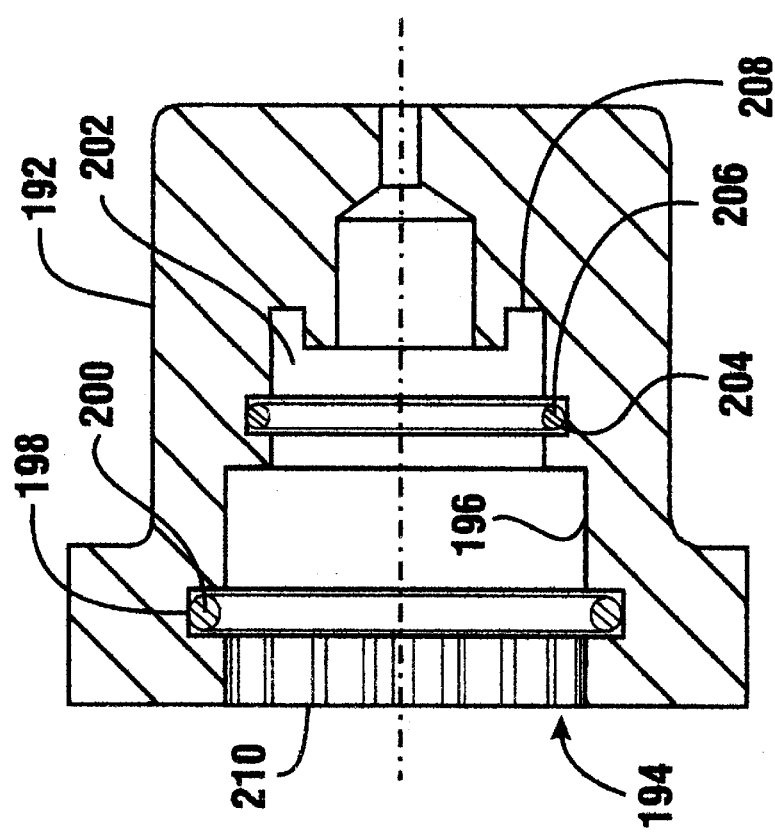
FIG. 18 is a cross sectional view of a tenth embodiment of a fitting body used in a joint of the present invention.
Figure 19:
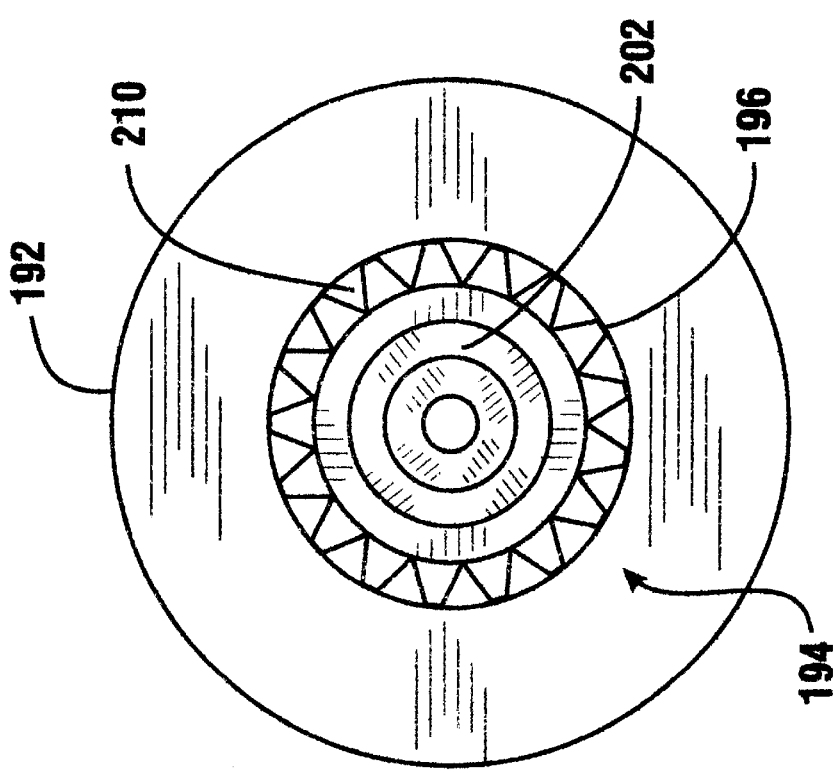
FIG. 19 is an end view of the fitting body shown in FIG. 18.

A further alternative fitting body 192 is shown in FIG. 18. Fitting body 192 is similar to fitting body 130 shown in FIG. 13 except as otherwise described. Fitting body 192 includes a bore 194. Bore 194 is bounded by a generally annular bore wall 196. Bore wall 196 includes an annular groove 198 in which an o-ring 200 is positioned.

Fitting body 192 further includes a sleeve area 202. Sleeve area 202 includes an annular groove 204 in which an o-ring 206 is positioned. Sleeve area 202 also includes a radially extending annular recess 208.

Bore wall 196 includes a plurality of serrations 210. Each serration is tapered to a point. Serrations 210 extend generally axially and radially inwardly from the bore wall 196, and are positioned adjacent to an axially outward end of the bore.

When beads are formed in the fitting body 192 in the manner previously described, the beads which form in the bead formation area adjacent to bore wall 196 engage in interfitting relation with serrations 196. The engagement of the bead material and the serrations resists axial pullout of the tube from the fitting body. Such engagement further strongly resists relative rotational movement of the tube and the fitting body. This enhances resistance to separation and reduces failures of the joint due to twisting forces.

It should be understood that an alternative embodiment of the joint fitting body 192 may be modified to position the serrations in other areas adjacent the bore wall. In addition, one or both of the o-rings and their corresponding annular grooves may be omitted, or additional o-rings or other sealing structures added, depending on the particular temperature, pressure and material conditions under which the joint is required to operate.

Figure 20:
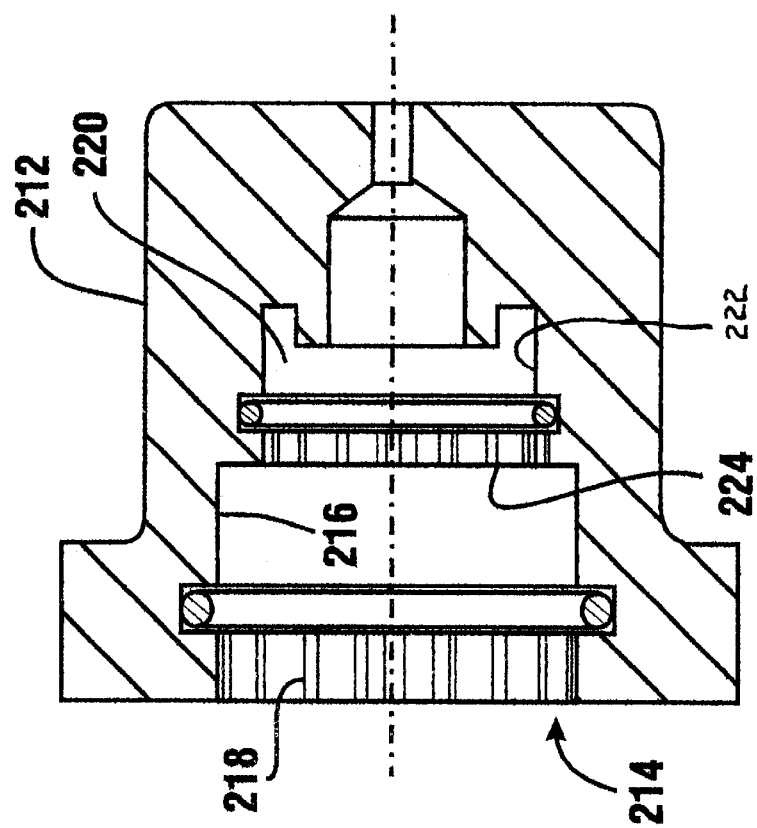
FIG. 20 is a cross sectional view of an eleventh embodiment of a fitting body used in a joint of the present invention.
Figure 21:
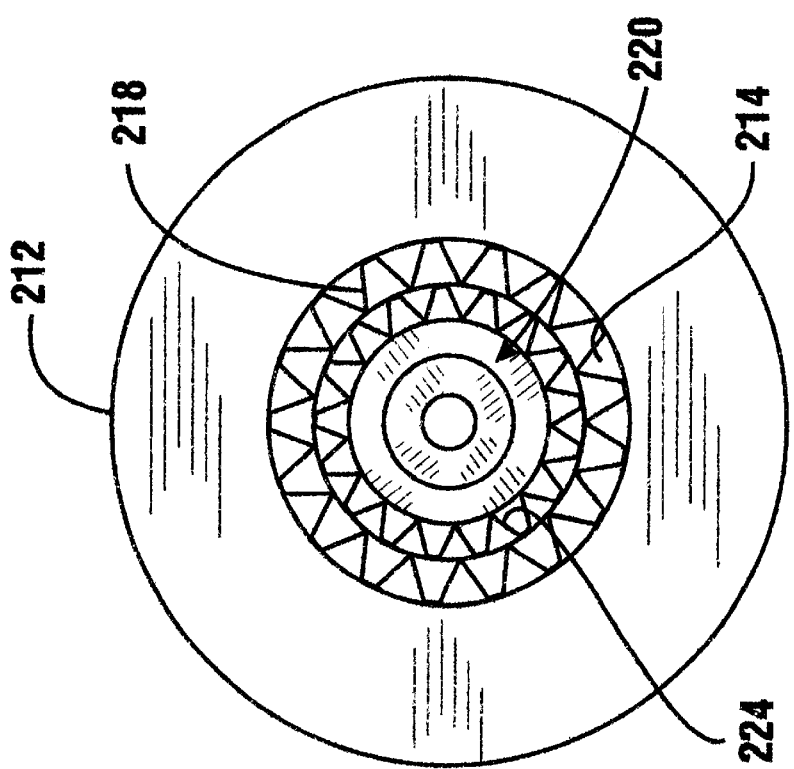
FIG. 21 is an end view of the fitting body shown in FIG. 20.

FIGS. 20 and 21 show a further alternative embodiment of a fitting body 212 used in connection with the joint of the present invention. Fitting body 212 is similar to fitting body 192 except as otherwise described. Fitting body 212 includes a bore 214. Bore 214 is bounded by a generally annular bore wall 216. Bore wall 216 includes serrations 218 similar to serrations 210 in fitting body 192.

Fitting body 212 further includes a sleeve area 220. Sleeve area 220 is bounded by sleeve area wall 222. Sleeve area wall 222 includes generally axially and radially inward extending tapered serrations 224 therein.

Serrations 224 are preferably sized to engage the outer wall of the tube as the tube is pressed into the sleeve area. Serrations 224 preferably engage and somewhat deform the outer surface of the tube material upon insertion of the tube into the sleeve area. This provides a first area of engagement between the fitting body 212 and the inserted tube which resists relative rotational movement. Upon formation of the joint in the manner previously discussed with reference to fitting body 192, beads are formed in the tube in a bead formation area adjacent to bore wall 216. The beads which are formed engage serrations 218 on the bore wall. Such engagement further serves to hold the tube axially and rotationally engaged with the fitting body.

It should be understood that the gasket structures shown in connection with fitting body 212 are exemplary. Only different or additional types of gasket structures as well as gasket materials may be used depending on the pressures, temperatures and materials involved.

As is apparent from the foregoing description, the tube and fitting bodies which are used to form the connecting joints of the present invention have a relatively simple geometry which is readily manufactured. In addition, formation of the joints is accomplished through novel processes which enable the joints to be quickly formed at high speed using automated equipment. This further reduces costs.

It should further be understood that while the exemplary embodiments of the joints shown include fitting bodies with bores that have generally axially extending walls which engage the beads, other embodiments may have walls which are tapered. As a result, such embodiments of the invention with tapered walls are considered as generally axially extending for purposes of this invention.

Further, those skilled in the art of tube fittings and connectors will be enabled to devise other configurations for joints which constitute embodiments of the present invention. From the examples presented herein, such other embodiments may be devised which have a wide range of configurations which incorporate the principles of the invention and which may be tailored to the particular operating environment in which the joint connection will be used.

Further, the method described for forming the joints and the equipment used in connection therewith are merely exemplary, and those skilled in the art may devise numerous alternatives within the scope of the present invention.

Thus, the conduit connector and method of the present invention achieves the above stated objectives, eliminates difficulties encountered in the use of prior connectors and methods, solves problems and attains the desirable results described herein.

In the foregoing description certain terms have been used for brevity, clarity and understanding, however no unnecessary limitations are to be implied therefrom because such terms are used for descriptive purposes only and are intended to be broadly construed. Moreover, the descriptions and illustrations given herein are by way of examples and the invention is not limited to the exact details shown or described.

Further, in the following claims any feature described as a means for performing a function shall be construed as encompassing any means capable of performing the recited function and shall not be deemed limited to the particular means for performing the function shown herein or mere equivalents.

Having described the features, discoveries and principles of the invention, the manner in which it is constructed and utilized, and the advantages and useful results attained; the new and useful structures, devices, elements, arrangements, parts, combinations, systems, equipment, operations, methods and relationships are set forth in the appended claims.

I claim:

1. A joint connecting a tube and a fitting body made by a process comprising the steps of:
   extending a tube in a bore in a fitting body, wherein the bore is bounded by a bore wall, the bore wall including a generally axially extending tube deformation area generally radially disposed from the tube when the tube is first extended therein;
   engaging an inward end of said tube against a stop face supported on the fitting body in the bore;
   compressing the tube extending in the bore in at least an axial direction to engage the tube to the bore wall in fixed fluid tight engagement, wherein three beads are formed during the engagement of the tube to the bore wall in fixed fluid tight engagement;
   wherein the joint comprises
      a tube,
         wherein the tube includes three beads,
            wherein the beads comprise deformed portions of the tube,
            wherein the beads comprise at least one radially outwardly extending bead,
               wherein the at least one radially outwardly extending bead comprises an outermost radially disposed surface,
      a fitting body,
         wherein the fitting body includes a bore bounded by a bore wall,
            wherein the outermost radially disposed surface engages the bore wall in fixed fluid tight engagement.

2. The joint according to claim 1
   wherein the beads comprise at least two radially outwardly extending beads,
      wherein the at least two radially outwardly extending beads each comprise an outermost radially disposed surface, wherein each outermost radially disposed surface engages the bore wall in fixed fluid tight engagement.

3. The joint according to claim 1 wherein the process of making the joint further comprises the step of deforming a portion of the fitting body to form a bead retaining ridge, wherein the joint further comprises having the fitting body include a deformed portion comprising a bead retaining ridge, wherein the retaining ridge engages a radially outwardly extending bead.

4. The joint according to claim 3 wherein the retaining ridge engaging the bore wall, wherein the joint further comprises having the retaining ridge engage a radially outwardly extending bead having an outermost radially disposed surface engaging the bore wall in fixed fluid tight engagement.

5. The joint according to claim 4 wherein the portion of the fitting body is deformed by engagement with a tool.

6. The joint according to claim 5 wherein the tool includes a jaw assembly.

7. The joint according to claim 6 wherein the jaw assembly includes a bull nose.

8. The joint according to claim 6 wherein the process of making the joint further comprises the step of engaging the tube with the jaw assembly.

9. The joint according to claim 8 wherein the tube is compressed by movement of the jaw assembly relative to the fitting body.

10. The joint according to claim 4 wherein the deformed fitting body engages a bead engaging the bore wall with a hook shaped engagement.

11. The joint according to claim 3 wherein the retaining ridge extends radially inward.

12. The joint according to claim 11 wherein the retaining ridge extends into the bore.

13. The joint according to claim 11 wherein the retaining ridge extends into the tube deformation area.

14. The joint according to claim 11 wherein the retaining ridge extends both radially and axially inward in the bore.

15. The joint according to claim 14 wherein the retaining ridge is tapered axially and radially.

16. The joint according to claim 11 wherein the retaining ridge extends adjacent an opening to the bore.

17. The joint according to claim 16 wherein the retaining ridge includes an annular ridge.

18. The joint according to claim 16 wherein the retaining ridge includes an arcuate ridge.

19. The joint according to claim 16 wherein the retaining ridge includes discrete arcuate segments.

20. The joint according to claim 4 wherein the retaining ridge increases resistance to pull apart.

21. The joint according to claim 1 wherein the bore wall is generally axially extending.

22. The joint according to claim 1 wherein the bore wall is tapered.

23. A joint connecting a tube and a fitting body made by a process comprising the steps of:
extending a tube in a bore in a fitting body, wherein the bore is bounded by a bore wall, the bore wall including a generally axially extending tube deformation area generally radially disposed from the tube when the tube is first extended therein;
engaging an inward end of said tube against a stop face supported on the fitting body in the bore;
compressing the tube extending in the bore in at least an axial direction to form three extending beads in the tube, wherein the three beads engage the bore wall in the tube deformation area in fixed fluid tight engagement;
wherein the joint comprises
a tube,
wherein the tube includes three beads,
wherein the beads comprise deformed portions of the tube,
wherein the beads comprise three radially outwardly extending beads,
wherein the three radially outwardly extending beads each comprise an outermost radially disposed surface,
a fitting body,
wherein the fitting body includes a bore bounded by a bore wall,
wherein each outermost radially disposed surface engages the bore wall in fixed fluid tight engagement.

24. A joint connecting a tube and a fitting body made by a process comprising:
extending a tube in a bore in a fitting body, wherein the bore is bounded by a bore wall, the bore wall including a generally axially extending tube deformation area generally radially disposed from the tube when the tube is first extended therein, wherein the tube deformation area is bounded by a generally axially extending bore wall portion;
engaging an inward end of said tube against a stop face supported on the fitting body in the bore;
compressing the tube extending in the bore in at least an axial direction to engage the tube to the bore wall portion in fixed fluid tight engagement, wherein three beads are formed during the compressing;
wherein the joint comprises
a tube,
wherein the tube includes three beads,
wherein the beads comprise deformed portions of the tube,
wherein the beads comprise at least two radially outwardly extending beads,
wherein the at least two radially outwardly extending beads each comprise an outermost radially disposed surface,
a fitting body,
wherein the fitting body includes a bore bounded by a bore wall,
wherein each outermost radially disposed surface engages the bore wall in fixed fluid tight engagement.

25. The joint according to claim 1 wherein the step of extending a tube in a bore includes extending a bead-free tube.

26. The joint according to claim 1 wherein the tube deformation area is bounded by a generally axially extending bore wall portion, wherein the step of compressing the tube includes engaging the tube to the bore wall portion in fixed fluid tight engagement.

27. A method comprising:
extending a tube in a bore in a fitting body, wherein the bore is bounded by a bore wall, the bore wall including a generally axially extending tube deformation area generally radially disposed from the tube when the tube is first extended therein;
engaging an inward end of said tube against a stop face supported on the fitting body in the bore; and
compressing the tube extending in the bore in at least an axial direction to engage the tube with the bore wall in fixed fluid tight engagement, wherein three beads are formed during the engagement of the tube with the bore wall, wherein at least one of the beads extends radially outwardly, wherein the at least one radially outwardly extending bead comprises an outermost radially disposed surface, and wherein the outermost radially disposed surface engages the bore wall in fixed fluid tight engagement.

28. The method according to claim 27 further comprising deforming a portion of the fitting body to form a bead retaining ridge, wherein the bead retaining ridge engages a radially outwardly extending bead.

29. The method according to claim 27 wherein the tube deformation area is bounded by a generally axially extending bore wall portion, further comprising engaging the tube to the bore wall portion in fixed fluid tight engagement.

30. The method according to claim 28 wherein the bead retaining ridge engages a radially outwardly extending bead having an outermost radially disposed surface engaging the bore wall in fixed fluid tight engagement.

31. The joint according to claim 1 wherein the beads comprise three radially outwardly extending beads, wherein the three radially outwardly extending beads each comprise an outermost radially disposed surface, and wherein each outermost radially disposed surface engages the bore wall in fixed fluid tight engagement.

* * * * *